(No Model.)

A. J. HASKELL.
RESAWING MACHINE.

No. 499,424.  Patented June 13, 1893.

Witnesses:

Inventor,
Andrew J. Haskell
By Dewey & Co.
Attys

THE NORRIS PETERS CO., PHOTO-LITHO., WASHINGTON, D. C.

UNITED STATES PATENT OFFICE.

ANDREW J. HASKELL, OF SAN FRANCISCO, CALIFORNIA.

RESAWING-MACHINE.

SPECIFICATION forming part of Letters Patent No. 499,424, dated June 13, 1893.

Application filed November 11, 1892. Serial No. 451,671. (No model.)

*To all whom it may concern:*

Be it known that I, ANDREW J. HASKELL, a citizen of the United States, residing in the city and county of San Francisco, State of California, have invented an Improvement in Resawing-Machines; and I hereby declare the following to be a full, clear, and exact description of the same.

My invention relates to a machine for resawing lumber. It consists in certain details of construction which will be more fully explained by reference to the accompanying drawings, in which—

Figure 1:
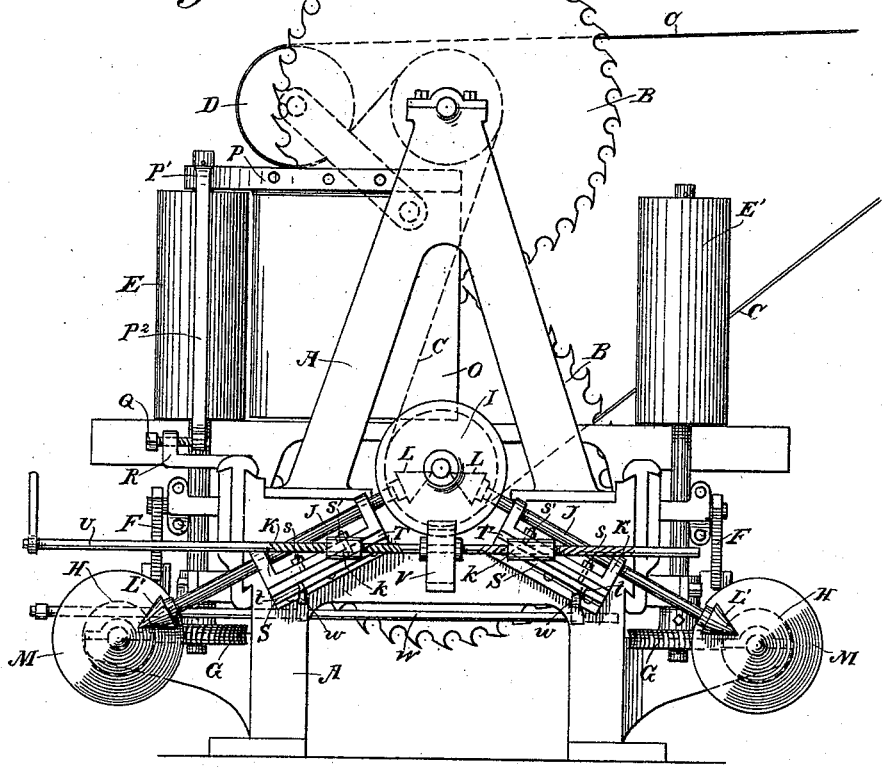
Figure 2:
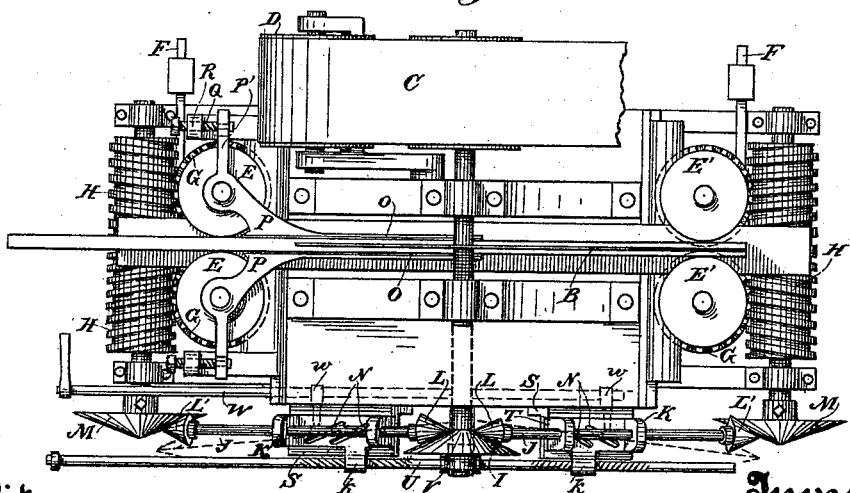
Figure 3:
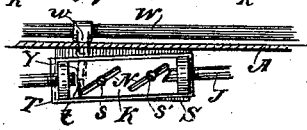

Figure 1 is a side elevation. Fig. 2 is a plan view. Fig. 3 is a detail view of the disengaging and speed regulating device.

In the usual construction of re-sawing machines it is customary to have two pairs of vertical adjustable rollers between which the lumber to be re-sawed is caused to pass, and by which it is fed to the saw. These rollers are driven by gearing so as to rotate simultaneously in the desired direction.

The object of my invention is to do away with a part of the rollers and to substitute an improved means for driving and regulating the speed, and certain other details.

A is the frame of any suitable construction having journaled upon it the arbors of the saws B which serve to cut the lumber. These saws are driven by a belt C passing from the source of power around pulleys upon the saw arbors, and also around a tightening pulley D as shown. The guiding rolls E, between which the lumber passes, and from which it is fed to the saws, are journaled on upright shafts, and have the usual sliding weight-operated levers F by the movement of which they are separated to receive the lumber, and afterward closed together to exert a pressure upon it. The vertical shafts to which the rollers E are fixed have upon their lower ends the worm gears G, and these engage the right and left threaded screws H by which they are driven so as to rotate the feed rolls E. Power to move the screws is derived from the lower saw arbor which has fixed to its outer end the beveled disk I.

J J are shafts journaled on movable supports K and having beveled friction wheels L and L' fixed to their opposite ends. The friction wheels L form a contact with the beveled disk I, and the shafts are thus rotated, and the friction wheels L' form a contact with the beveled disks M which are fixed to the ends of the shafts of the screws H by which the feed rolls are driven.

The supports K of the shafts J have inclined slots N made through them, the angle of these slots corresponding with the bevel of the disks I and M. The shaft supports are fixed upon the supporting brackets S by bolts *s* passing through these slots. When the shaft supports are moved so that the friction wheels L are nearest to the point of the cone I, the friction wheels L' will be at the greatest distance from the points of the cones M, and thus the slowest speed will be transmitted to the feed rollers. A movement of the shafts J in the opposite direction carries the friction rollers L to the outer periphery of the disk I, and the rollers L' correspondingly nearer to the centers of the disks M, and the feed will be correspondingly increased.

In order to shift the shafts J simultaneously, I employ a cross shaft U which enters through the nuts *k* cast upon the slides K, its center being supported in the slotted center piece V projecting from the main frame. Those parts of the shaft U which enter the nuts *k* are, for a certain distance, screw-threaded, the one right and the other left-handed, so that when the shaft is rotated by means of its crank handle the supports K are moved either up or down, while the former follows the movement being kept steady and guided by the slotted center piece V.

To disengage the shafts J altogether from the disks I and M, I employ a rock shaft W parallel with the shaft U. This shaft carries two short crank arms *w* which engage pins *t* the latter projecting down through slots in the brackets S from an intermediate slide plate T. The plate T carries the bolts *s* on its upper surface and on which the support K with its slots N also moves. But the bolt *s'* projects from the bracket S and forms the fulcrum about which the plates K and T are moved by the arms *w* and intermediate pin *t*, and by this movement the cone L' is thrown outwardly from disk M and the opposite cone L inwardly from the disk I therefor freeing them from their engagement with the source of power, and, consequently, stopping the feeding altogether.

The rollers E are shown at the point where the lumber enters, and two corresponding rollers E' at the point beyond the saws, to steady the lumber as it leaves the machine. Each set of rollers is actuated in the same manner as just described.

O O are two plates extending from the rollers E to a point nearly between the saw arbors, these plates standing approximately parallel with each other so that the lumber after leaving the rollers E passes between them. These plates are secured to the supporting bars P which diverge, as shown in the plan view, and are journaled upon the vertical shafts of the rollers E where they project beyond the rollers. Arms P' extend outwardly from the journal portion of the arms P, and thence extend downwardly outside of the rollers, as shown at P². Screws Q pass through screw-threaded brackets R, and the screws are connected with the vertical bars P² so that by turning the screws in one direction or the other, the arms P are correspondingly turned about the shafts of the rolls E, and the pressure plates O are separated or closed together to suit the thickness of the lumber passing between them. These plates take the place of the rollers formerly used, and as they extend well along on each side of the saws, they steady and guide the lumber to prevent any irregular movement or variation in the thickness of the two sides. By this construction I have greatly simplified the machinery for re-sawing lumber.

Having thus described my invention, what I claim as new, and desire to secure by Letters Patent, is—

1. A re-sawing machine consisting of the vertical rotating saws, a single pair of vertical rollers between which the lumber passes and by which it is fed to the saws, plates extending from the rollers toward the saws between which plates the lumber is supported and guided, arms fulcrumed upon the shafts of the feed rollers and attached to the plates, and mechanism by which the arms are moved so as to separate the plates or move them nearer together, substantially as herein described.

2. A re-sawing machine consisting of the vertically rotating saws, a single pair of feed rolls between which the lumber is fed to the saws, adjustable guide plates extending from said rolls toward the saws and between which the lumber passes, and a second pair of rolls through which the lumber passes after leaving the saws, worm gears fixed to the shafts of the feed and discharge rolls and right and left threaded screws engaging said gears and communicating motion thereto, cone-shaped disks M M' fixed to the screw-shafts and a driving cone I of corresponding pitch fixed to the shaft from which power is derived, shafts J having cone pinions L and L' upon the opposite ends adapted to form contact with the driving and driven cones respectively, supports in which said shafts are journaled having angular slots, and means for adjusting the supports in the line of said slots, whereby the position of the cone pinions upon the driving and driven cones is changed so as to increase or decrease their speed of rotation and the relative speed of the feed rolls, substantially as herein described.

3. A re-sawing machine consisting of the vertically rotating saws, feed rolls between which the lumber passes to the saws and rolls by which it is received after it passes the saws, and mechanism by which the rolls are rotated, a driving cone upon the power shaft and corresponding cones upon the shafts which transmit motion to the rolls, shafts J with cones L L' by which motion is transmitted from the power shaft to the roll driving shafts and means for adjusting them to regulate the speed of the rolls, simultaneously, consisting of the right and left screw-threaded screw-shaft U passing through nuts upon the movable slides K, substantially as herein described.

In witness whereof I have hereunto set my hand.

ANDREW J. HASKELL.

Witnesses:
S. H. NOURSE,
GEO. H. STRONG.